United States Patent
Okuhara

(10) Patent No.: US 9,281,670 B2
(45) Date of Patent: Mar. 8, 2016

(54) CORRUGATED TUBE PROVIDED WITH PASSAGE MAINTENANCE MEMBER, AND WIRE HARNESS

(75) Inventor: Takashi Okuhara, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 59 days.

(21) Appl. No.: 14/238,575

(22) PCT Filed: Feb. 16, 2012

(86) PCT No.: PCT/JP2012/053596
§ 371 (c)(1),
(2), (4) Date: Feb. 12, 2014

(87) PCT Pub. No.: WO2013/031255
PCT Pub. Date: Mar. 7, 2013

(65) Prior Publication Data
US 2014/0196929 A1    Jul. 17, 2014

(30) Foreign Application Priority Data
Sep. 2, 2011 (JP) ................................. 2011-191465

(51) Int. Cl.
*F16L 11/11* (2006.01)
*H02G 3/04* (2006.01)
*B60R 16/02* (2006.01)

(52) U.S. Cl.
CPC .......... *H02G 3/0468* (2013.01); *B60R 16/0215* (2013.01); *F16L 11/11* (2013.01)

(58) Field of Classification Search
CPC .... H02G 3/0468; B60R 16/0215; F16L 11/11

USPC ........................................................ 174/68.3
See application file for complete search history.

(56) References Cited

U.S. PATENT DOCUMENTS

| 3,632,069 A | 1/1972 | Thayer et al. |
| 5,905,231 A * | 5/1999 | Houte et al. ................. 174/68.3 |

FOREIGN PATENT DOCUMENTS

| JP | U-4-86022 | 7/1992 |
| JP | A-7-135724 | 5/1995 |
| JP | A-2000-184551 | 6/2000 |

(Continued)

OTHER PUBLICATIONS

Apr. 3, 2012 International Search Report issued in International Patent Application No. PCT/JP2012/053596.

*Primary Examiner* — Dhirubhai R Patel
(74) *Attorney, Agent, or Firm* — Oliff PLC

(57) ABSTRACT

A passage restricting member is attached to a corrugated tube. This corrugated tube includes a corrugated tube, a passage maintenance member, and an attachment member. The passage maintenance member is die-molded so as to maintain a shape in which at least a portion is curved in the longitudinal direction, and the transverse cross-section is arc shaped. The passage maintenance member has an opening penetrating to the internal peripheral side and the external peripheral side. The attachment member has an internal peripheral engaging part engaging with an internal peripheral portion of a slit in the corrugated tube, an external peripheral engaging part engaging with an external peripheral portion of the opening in the passage maintenance member, and a connecting part for connecting the internal peripheral engaging part and the external peripheral engaging part while disposed in the slit and the opening.

19 Claims, 4 Drawing Sheets

(56) References Cited

FOREIGN PATENT DOCUMENTS

| | | |
|---|---|---|
| JP | A-2002-64917 | 2/2002 |
| JP | A-2003-224377 | 8/2003 |
| JP | A-2003-336789 | 11/2003 |
| JP | A-2006-149012 | 6/2006 |
| JP | A-2006-296166 | 10/2006 |

* cited by examiner

CORRUGATED TUBE PROVIDED WITH PASSAGE MAINTENANCE MEMBER, AND WIRE HARNESS

This application is the national phase of PCT International Application No. PCT/JP2012/053596 that has an International filing date of Feb. 16, 2012 and designated the United States of America and claims priority to Japanese Patent App. No. JP 2011-191465 that was filed on Sep. 2, 2011. The disclosure of the prior applications is hereby incorporated by reference herein in their entirety.

BACKGROUND TECHNOLOGY

As disclosed in patent references Japanese Published Utility Model Application 4-86022, Japanese Published Patent Application 2000-184551, Japanese Published Patent Application 2002-64917, Japanese Published Patent Application 2006-296166, technologies are known in which a wire harness arranged in a vehicle or the like is covered with a corrugated tube with good flexibility.

SUMMARY

Problems to be Resolved by the Invention

However, because a corrugated tube itself has excellent flexibility, a passage of a wire harness cannot be constantly maintained. Because of this, the passage of the wire harness needs to be constantly maintained by fixing a clamp member that is mounted to the wire harness or the corrugated tube at a constant position of a vehicle. As the number of locations in which clamp members are fixed increases, there is a possibility that parts cost, mounting cost and the like may increase.

Here, through a bucket-shaped resin molded product (or protector) that is three-dimensionally formed conforming to a location in which the wire harness is arranged, the wire harness can be protected, and the passage can be constantly maintained.

However, in order to three-dimensionally form a resin molded product that can protect a wire harness, conforming to the location in which the wire harness is arranged, the molded shape becomes complex. Thus, the manufacturing cost increases.

Thus, a structure is proposed in which a passage maintaining member that is die-molded so as to maintain a shape in which at least a portion is bent along a longitudinal direction is mounted to a corrugated tube, and the corrugated tube and a wire harness inside the corrugated tube are maintained in a specified bent shape. For a structure in which a passage maintaining member is mounted to a corrugated tube, a structure is suggested in which a pair of concave groove portions is formed in a passage maintaining member, and end peripheral portions at both sides of a slit of the corrugated tube fit into the pair of concave groove portions.

However, the passage maintaining member is constituted so as to have a portion to be exposed to an outer circumferential side of the corrugated tube. Thus, the presence of the portion to be exposed becomes a hindrance to visual recognition, so it is difficult to visually recognize a position relationship between the end peripheral portions at both sides of the slit of the corrugated tube and the pair of concave groove portions. Because of this, operability of fitting the end peripheral portions of both sides of the slit of the corrugated tube into the pair of concave groove portions is poor.

In particular, if a subject wire harness has a large diameter, it is necessary to increase rigidity of a passage restricting member so as to maintain the passage. Because of this, it is necessary to enlarge a cross section of the passage maintaining member, and the above-mentioned concave groove portions need to be made deep. Thus, the fitting operation becomes worse.

Thus, an object is to make it easy to mount a passage restricting member to a corrugated tube by mounting a passage maintaining member to the corrugated tube when wires are covered and the passage is constantly maintained.

Means of Solving the Problem

In order to solve the above-mentioned problem, in a first mode, there are provided: a corrugated tube in which annular convex portions and annular concave portions are alternately formed along a longitudinal direction and a slit is formed along the longitudinal direction; a passage maintaining member that is die-molded so as to maintain a shape at least part of which is curved along the longitudinal direction, the passage maintaining member having a horizontal cross section formed in an arc shape, an opening that goes through inner and outer circumferential sides of the passage maintaining member being formed along at least part of the longitudinal direction, the passage maintaining member being arranged along an outer circumference of the corrugated tube in a state in which the opening is arranged at the outer circumferential side of the slit; and a mounting member having (i) an inner circumferential-side engaging portion that can be engaged to an inner circumferential-side portion of the slit of the corrugated tube, (ii) an outer circumferential-side engaging portion that can be engaged to an outer circumferential-side portion of the opening of the passage maintaining member, and (iii) a connector that connects the inner and outer circumferential-side engaging portions that are arranged at the slit and the opening.

A second mode is the corrugated tube with a passage maintaining member related to the first mode, in which the mounting member is a member that can be deformed according to the shape of the passage maintaining member in the longitudinal direction.

A third mode is the corrugated tube with a passage maintaining member related to the first or second mode, in which the horizontal cross-sectional shape of the mounting member is formed in the same shape along the longitudinal direction of the mounting member.

A fourth mode is the corrugated tube with a passage maintaining member related to the first or second mode, in which at least one of the inner and outer circumferential-side engaging portions is intermittently formed along the longitudinal direction of the mounting member.

A fifth mode is the corrugated tube with a passage maintaining member related to any of the first through fourth modes, in which the passage maintaining member is divided into two divided parts at the opening.

A sixth mode is the corrugated tube with a passage maintaining member related to any of the first through fourth modes, in which the opening is formed in the passage maintaining member so as to maintain both side portions of the passage maintaining member in a connected state.

A wire harness related to a seventh mode is provided with the corrugated tube with a passage maintaining member as set forth in any of the first through sixth modes; and a wire harness main body portion that is provided with at least one wire and is inserted through the corrugated tube that has the passage maintaining member.

Effects

According to the corrugated tube with a passage maintaining member related to the first mode, wires can be covered and protected by the corrugated tube, and the passage can be constantly maintained by the passage maintaining member. Additionally, in a state in which the passage maintaining member is arranged along the outer circumference of the corrugated tube, the inner circumferential-side engaging portion is engaged to the inner circumferential-side portion of the slit of the corrugated tube. At the same time, the outer circumferential-side engaging portion is engaged to the outer circumferential-side portion of the opening of the passage maintaining member. Thus, the passage maintaining member can be positioned and easily mounted with respect to the corrugated tube.

According to the second mode, the mounting member can be used according to various shapes of the passage maintaining member in the longitudinal direction. Because of this, versatility of the mounting member is excellent.

According to the third mode, the mounting member can be easily molded.

According to the fourth mode, the material that forms the mounting member can be reduced.

According to the fifth mode, the passage maintaining member is divided into two divided parts at the opening. Thus, the shape of each of the divided parts is simplified, and each divided part can be easily formed.

According to the sixth mode, the passage maintaining member can be handled as one member. Because of this, parts management becomes easy.

According to the wire harness related to the seventh mode, wires are covered with a corrugated tube, and the passage can be constantly maintained by the passage maintaining member. Additionally, in a state in which the passage maintaining member is arranged along the outer circumference of the corrugated tube, the inner circumferential-side engaging portion is engaged to the inner circumferential-side portion of the slit of the corrugated tube. At the same time, the outer circumferential-side engaging portion is engaged to the outer circumferential-side portion of the opening of the passage maintaining member. Thus, the passage maintaining member can be positioned and easily mounted with respect to the corrugated tube.

DETAILED DESCRIPTION OF THE EMBODIMENTS

Figure 1:
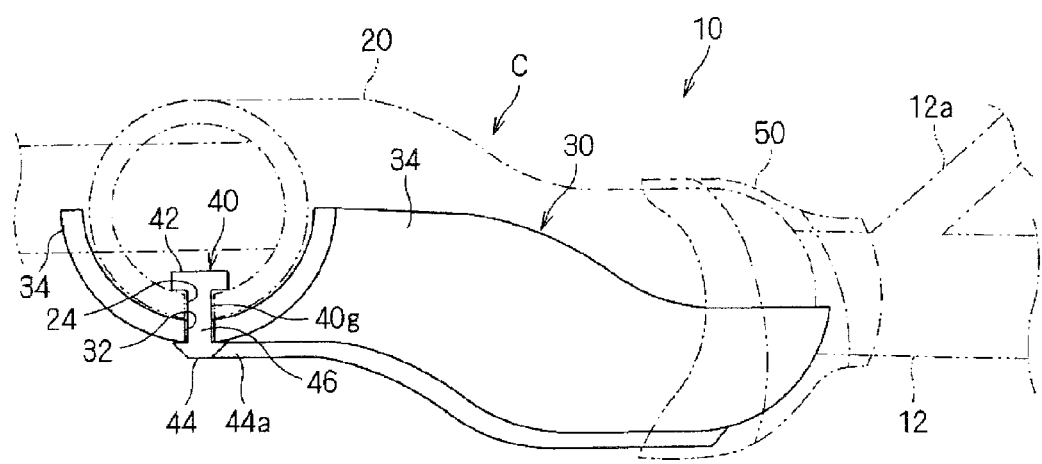
FIG. 1 is a schematic perspective view showing a mounting portion of a corrugated tube of a wire harness.
Figure 2:
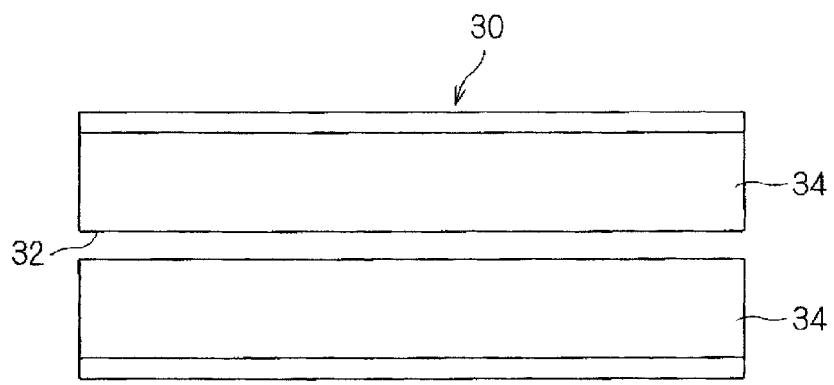
FIG. 2 is a plan view showing a passage maintaining member.
Figure 3:
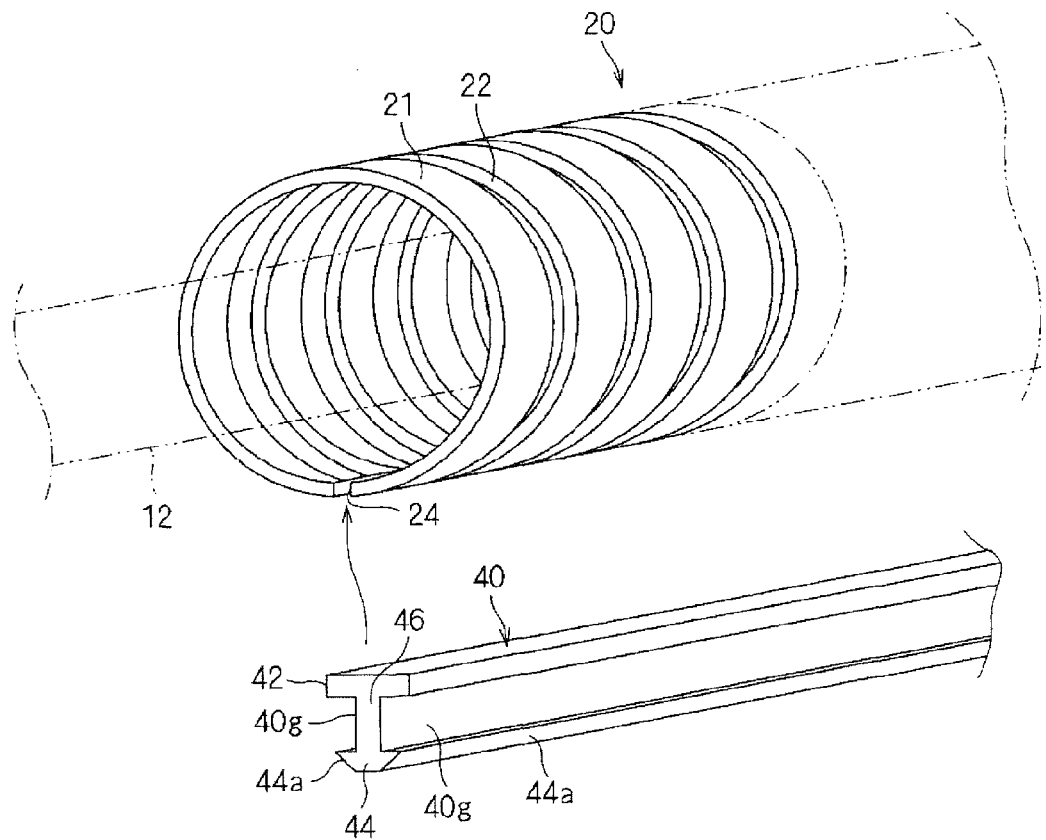
FIG. 3 is a perspective view showing the corrugated tube and a mounting member.
Figure 4:
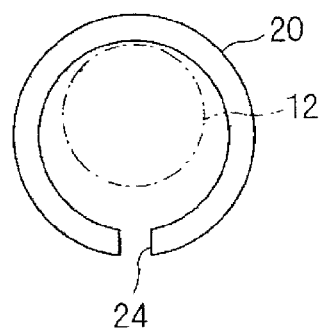
FIG. 4 is an explanatory view showing a step of mounting the passage maintaining member to the corrugated tube.
Figure 5:
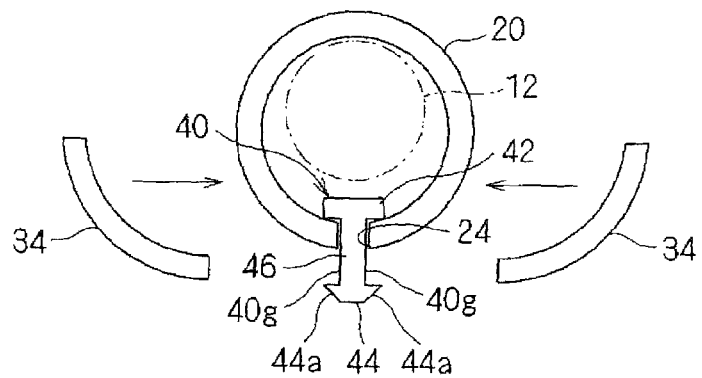
FIG. 5 is an explanatory view showing a step of mounting the passage maintaining member to the corrugated tube.

The following explains a corrugated tube with a passage maintaining member related to embodiments, and a corrugated tube with the passage maintaining member. FIG. 1 is a schematic perspective view showing a mounting portion of a corrugated tube 20 of a wire harness 10. FIG. 2 is a plan view showing a passage maintaining member 30. FIG. 3 is a perspective view showing a corrugated tube 20 and a mounting member 40. FIGS. 4 and 5 are explanatory views showing a step of mounting the passage maintaining member 30 and the mounting member 40 to the corrugated tube 20.

The wire harness 10 is provided with a wire harness main body portion 12, the corrugated tube 20, the passage maintaining member 30, and the mounting member 40.

The wire harness main body portion 12 is constituted such that a plurality of wires is bundled. More specifically, the wire harness main body portion 12 is constituted such that a plurality of wires are branched off and bundled according to the wiring configuration for a subject vehicle. The wire harness main body portion 12 does not necessarily need to be branched off, and may be constituted by a single wire. Furthermore, another optical cable or the like may be bundled to the wire harness main body portion 12.

When the wire harness main body portion 12 is arranged on a vehicle or the like, the wire harness main body portion 12 is bent according to the arrangement. In order to keep the wire harness main body portion 12 from interfering with a surrounding portion, the wire harness main body 12 may be maintained in a bent shape according to the arrangement. In such a case, a corrugated tube C with this passage maintaining member is mounted to the wire harness main body portion 12. In other words, the wire harness main body portion 12 is inserted through the corrugated tube C with the passage maintaining member. By so doing, the wire harness main body portion 12 is maintained in a specific bent shape. Additionally, the portion over which the corrugated tube C with the passage maintaining member is mounted to the wire harness main body portion 12 may be at least part of the wire harness main body portion 12. This may be part of the wire harness main body portion 12 or may be substantially the entire wire harness main body portion 12.

The corrugated tube 20 is a cylindrical member in which annular convex portions 21 and annular concave portions 22 are alternatively formed along a longitudinal direction (see FIG. 3) and is formed of resin or the like. The corrugated tube 20 is easily elastically deformed by step portions or the like between the annular convex portions 21 and the annular concave portions 22. Thus, the entire corrugated tube 20 has an easily deformable property. Normally, for the corrugated tube 20, a tube is used that has an inner diameter larger than (usually slightly larger than) an outer diameter of the portion of the wire harness main body portion 12 to be mounted.

Furthermore, on one side portion of the corrugated tube 20, a slit 24 is formed along the longitudinal direction. Additionally, by splitting and opening the corrugated tube 20 with the slit 24, the wire harness main body portion 12 can be easily arranged within the corrugated tube 20.

The passage maintaining member 30 is a long member that is die-molded so as to maintain a shape at least part of which is curved along a longitudinal direction and is formed of resin such as P.P. (polypropylene). In other words, the passage maintaining member 30 is formed in a shape at least part of which is curved at the time of die-molding. The curved shape of the passage maintaining member 30 is set in a shape corresponding to an arranging passage in which a portion of the wire harness main body portion 12 to be mounted is arranged. In the example shown in FIG. 1, an intermediate portion of the passage maintaining member 30 in the longitudinal direction is curved so as to form a moderate S shape, and both end portions of the passage maintaining member 30 are formed in a linear shape. Either the entire portion or part of the passage maintaining member 30 may be formed in a curved shape.

Furthermore, the portion formed in a curved shape may be formed in a shape that is curved in a plane, or may be formed in a dimensionally (three-dimensionally) curved shape.

Additionally, a horizontal cross section of the passage maintaining member 30 is formed in an arc shape. Here, in the width direction intermediate portion, the passage maintaining member 30 is divided into two divided parts 34 by an opening 32 formed over the entire longitudinal direction. Here, the horizontal cross-sectional shape of the passage maintaining member 30 forms a ½ arc shape as a whole, and a ¼ arc shape for each divided portion 34. An inner circumferential shape of the horizontal cross section of the passage maintaining member 30 is formed in a shape corresponding to an outer circumferential shape of the corrugated tube 20. In other words, the inner diameter of the passage maintaining member 30 is set to be the same as the outer diameter of the corrugated tube 20. By so doing, in a state in which the passage maintaining member 30 is adhered to the outer circumference of the corrugated tube 20, the passage maintaining member 30 can be arranged along the longitudinal direction of the corrugated tube 20.

The opening 32 is formed so as to go through the inner and outer circumferential sides of the passage maintaining member 30. Furthermore, by arranging a gap between the pair of divided parts 34 and arranging the pair of divided parts 34 along the outer circumference of the corrugated tube 20 on both sides of the slit 24, in state in which the opening 32 is arranged at the outer circumferential sides of the slit 24, the passage maintaining member 30 is arranged along the outer circumference of the corrugated tube 20.

Additionally, the dimension of the passage maintaining member 30 in the circumferential direction is not limited to the above-mentioned example, but other arc shapes such as a ¼ arc shape may be formed. The pair of divided parts 34 does not need to equally divide the passage maintaining member 30 into two portions, and the pair of divided parts 34 may be provided with different circumferential direction dimensions, respectively. Furthermore, the thickness of the passage maintaining member 30 may be uniform or irregular in either the longitudinal or circumferential direction.

The mounting member 40 is provided with an inner circumferential-side engaging portion 42, an outer circumferential-side engaging portion 44, and a connector 46.

The inner circumferential-side engaging portion 42 is constituted so as to be engageable to the inner circumferential-side portion of the slit 24 of the corrugated tube 20. Additionally, the outer circumferential-side engaging portion 44 is constituted so as to be engageable to the outer circumferential-side portion of the opening 32 of the passage maintaining member 30. The connector 46 is constituted so as to be arranged at the slit 24 and the opening 32, and in that arrangement, to allow the inner circumferential-side engaging portion 42 and the outer circumferential-side engaging portion 44 to be connected to each other. Additionally, at both side portions of the mounting member 40, a U-shaped groove 40g is formed, which is surrounded by the inner circumferential-side engaging portion 42, the connector 46, and the outer circumferential-side engaging portion 44. Side peripheral portions of the slit 24 of the corrugated tube 20 and side peripheral portions of the opening 32 of the passage maintaining member 30 fit into the grooves 40g.

More specifically, the connector 46 is formed in a thin long plate that can be arranged at the slit 24 and the opening 32. It is preferable that the thickness dimension of the connector 46 is set at a dimension that can be arranged in the slit 24 and the opening 32, and that the thickness is as thin as possible within a range that can maintain a state in which the inner circumferential-side engaging portion 42 and the outer circumferential-side engaging portion 42 are connected to each other. It is preferable that the width dimension of the connector 46 (a dimension in an inside-to-outside direction in a state in which the corrugated tube 20 and the passage maintaining member 30 are mounted) is substantially the same as a sum of the thickness dimension of the corrugated tube 20 and the thickness dimension of the passage maintaining member 30.

The inner circumferential-side engaging portion 42 is formed in a thin, long plate shape having a width dimension larger than the thickness dimension of the connector 46. This outer circumferential-side engaging portion 44 is arranged so as to protrude from one end portion (inside end portion) of the connector 46 to both sides.

The outer circumferential-side engaging portion 44 is formed in a thin, long plate shape having a width dimension larger than the thickness dimension of the connector 46. This outer circumferential-side engaging portion 44 is arranged so as to protrude from one end portion (outside end portion) of the connector 46 to both sides. Additionally, inclined surfaces 44a that are inwardly inclined in an outward direction are formed on both sides of the outward surface of the outer circumferential-side engaging portion 44. Thus, while the outer circumferential-side engaging portion 44 is arranged along the outer circumference of the passage maintaining member 30 at the outside of the opening 32, the protrusion shape with respect to the outer circumferential surface of the passage maintaining member 30 becomes as moderate as possible.

In this embodiment, the inner circumferential-side engaging portion 42, the outer circumferential-side engaging portion 44, and the connector 46 are continuously formed along the longitudinal direction. That is, the horizontal cross-sectional shape of the mounting member 40 is formed in the same shape along the longitudinal direction. Because of this, the mounting member 40 can be easily formed by extrusion molding or the like.

Additionally, the mounting member 40 is constituted so as to be deformable according to the shape of the passage maintaining member 30 in the longitudinal direction. The mounting member 40 can be formed by an elastomer such as rubber.

A procedure is explained in which the passage maintaining member 30 and the mounting member 40 are mounted to the wire harness main body portion 12.

First, by opening the corrugated tube 20 at the slit 24, the wire harness main body portion 12 is housed within the corrugated tube 20 (See FIG. 4).

Thereafter, while the corrugated tube 20 is opened at the slit 24, and the inner circumferential-side engaging portion 42 is arranged within the corrugated tube 20, the connector 46 is inserted at both side portions of the slit 24 of the corrugated tube 20 (see FIG. 5). In this state, passages of the wire harness main body portion 12, the corrugated tube 20, and the mounting member 40 are not restricted, and all three can be bendingly deformed.

Thereafter, the pair of divided parts 34 is arranged, with a distance therebetween, at both sides of the connector 46 protruding from the slit 24. Then, while the wire harness main body portion 12, the corrugated tube 20, and the mounting member 40 are made to be deformed according to the curved shape of the pair of divided parts 34, the inside end peripheral portions of the pair of divided parts 34 fit into gaps between outside portions of the slit 24 of the corrugated tube 20 and the outer circumferential-side engaging portion 44. Thus, the pair of divided parts 34 is mounted in a state that suppresses shifting with respect to the corrugated tube 20 in the circumferential direction, and suppresses removal to the outer circumferential side. By so doing, the corrugated tube 20 can be integrated to the passage maintaining member 30 so as to be curved along the shape of the passage maintaining member 30. Furthermore, the pair of divided parts 34 may be sequentially mounted.

Thereafter, as needed, by winding a tie band, an adhesive tape 50, or the like about the outer circumference of the corrugated tube 20, a closed state of the corrugated tube 20 can be maintained. At the same time, integration of the corrugated tube 20 and the passage maintaining member 30 is maintained (see FIG. 1). So-called "rough winding" or "tight winding" may be used for the structure of winding an adhesive tape. Additionally, an adhesive tape may be entirely or partially wound about the passage maintaining member 30 in the longitudinal direction. It is preferable that the adhesive tape 50 is also wound about the wire harness main body portion 12 that extends outward from the end portions of the corrugated tube 20. By so doing, the corrugated tube 20 and the passage maintaining member 30 are positioned with respect to the wire harness main body portion 12, and a state is constantly maintained in which bending is performed by the passage maintaining member 30 with respect to a branched end portion 12a of the wire harness main body portion 12 (see FIG. 1).

According to the corrugated tube C with a passage maintaining member that is thus constituted and the wire harness 10, wires can be covered and protected by the corrugated tube 20, and the passage can be constantly maintained by the passage maintaining member 30.

Additionally, in a state in which the passage maintaining member 30 is arranged along the outer circumference of the corrugated tube 20, the inner circumferential-side engaging portion 42 is engaged to the inner circumferential-side portion of the slit 24 of the corrugated tube 20, and the outer circumferential-side engaging portion 44 is formed at the outer circumferential-side portion of the opening 32 of the passage maintaining member 30. Thus, the passage maintaining member 30 can be easily mounted so as to be positioned with respect to the corrugated tube 20.

In particular, in this embodiment, in a state in which the mounting member 40 is mounted to the corrugated tube 20, a gap between the outside portion of the slit 24 of the corrugated tube 20 and the outer circumferential-side engaging portion 44 can be visually seen from outside. Because of this, while this gap is being visually recognized, the inside end peripheral portion of the divided parts 34 can easily fit in the gap.

Additionally, when the passage of the wire harness main body portion 12—whose diameter is relatively large—is restricted, a circumferential direction length of the passage maintaining member 30 may be made long, or the thickness may be made thick. Thus, there is no need for making the groove 40g of the mounting member 40 deep. Because of this, even when the passage of the wire harness main body portion 12 whose diameter is relatively large is restricted, an operation of mounting the passage maintaining member 30 can easily be performed.

Additionally, the passage maintaining member 30 itself is a member having a horizontal cross-sectional arc shape. Thus, even if it is a relatively complex shape, such as a three-dimensional shape, it can be relatively easily die-molded.

Additionally, in this embodiment, the passage maintaining member 30 is divided into two divided parts 34 at the opening 32, so the shape of each of the divided parts 34 is simplified. Because of this, even if this is a relatively complex shape, such as a three-dimensional shape, it can be more easily die-molded.

Furthermore, the slit 24 of the corrugated tube 20 is sealed by the mounting member 40, so wires can be suppressed from falling from a middle portion of the corrugated tube 20 in the longitudinal direction.

Furthermore, the mounting member 40 is constituted so as to be deformable according to the shape of the passage maintaining member 30 in the longitudinal direction. Thus, passage maintaining members 30 having various curved shapes can be used for mounting to the corrugated tube 20. Because of this, versatility of the mounting member 40 is excellent.

Of course, in the same manner as the passage maintaining member 30, the mounting member 40 is a long member that is die-molded so as to maintain a shape at least part of which is curved along a longitudinal direction according to the arrangement passage in which the portion of the wire harness main body portion 12 to be mounted is arranged. In this case, the mounting member 40 may be formed of resin such as P.P. (polypropylene), which has rigidity to a certain degree.

Furthermore, the horizontal cross-sectional shape of the mounting member 40 is formed in the same shape along the longitudinal direction. Thus, the mounting member 40 can be easily formed by extrusion molding or the like.

Based on the above-mentioned embodiments, various modified examples will be explained.

Figure 6:
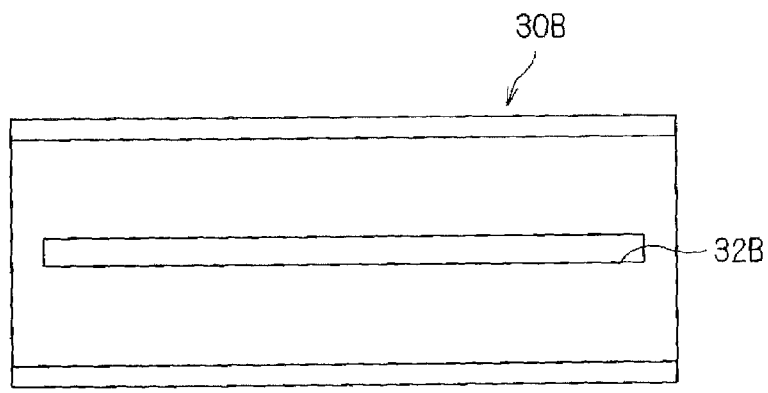
FIG. 6 is a plan view showing the passage maintaining member related to a first modified example.

First, as described in the first modified example shown in FIG. 6, in a passage maintaining member 30B corresponding to the passage maintaining member 30, an opening 32B may be formed so as to maintain both side portions in a connected state. Here, in a width-direction intermediate portion of the passage maintaining member 30, the opening 32B is formed along the longitudinal direction. At both end portions of the opening 32B, both side portions of the passage maintaining member 30 are connected. That is, the opening 32B is formed in an opening shape surrounded on all sides. It is preferable that the width dimension of the opening 32B is approximately the same as the thickness dimension of the connector 46.

In this case, the passage maintaining member 30B is mounted as follows.

Figure 7:
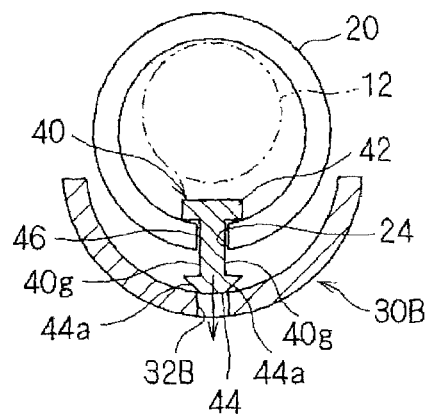
FIG. 7 is an explanatory view showing a step of mounting the passage maintaining member to the corrugated tube.

That is, as shown in FIG. 7, by opening the corrugated tube 20 at the slit 24, the wire harness main body portion 12 is housed in the corrugated tube 20. Furthermore, while the inner circumferential-side engaging portion 42 is arranged within the corrugated tube 20 by opening the corrugated tube 20 at the slit 24, the connector 46 is inserted at both side portions of the slit 24 of the corrugated tube 20.

Then, while the wire harness main body portion 12 and the corrugated tube 20 are being bent according to the curved shape of the passage maintaining member 30B, the passage maintaining member 30B is arranged at the outside portion of the slit 24 of the corrugated tube 20. At that time, when the connector 46 and the outer circumferential-side engaging portion 44 that protrude from the slit 24 are pushed into the opening 32B, the opening 32B is pushed against the inclined surfaces 44a and spread. Additionally, when the outer circumferential-side engaging portion 44 goes past the inside of the opening 32B, the opening 32B returns to its original width. By so doing, the outer circumferential-side engaging portion 44 is engaged to the passage maintaining member 30B from the outer circumferential side of the opening 32B, and the passage maintaining member 30B is mounted so as to suppress shifting with respect to the corrugated tube 20 in the circumferential direction, and suppress removal to the outer circumferential side.

Thereafter, as needed, by winding a tie band, an adhesive tape, or the like about the outer circumference of the corrugated tube 20, integration of the corrugated tube 20 and the passage maintaining member 30 can be more reliably maintained.

According to the first modified example, the passage maintaining member 30B is not divided into two parts. Thus, the passage maintaining member 30B can be handled as one member. Because of this, managing parts is simplified.

Figure 8:
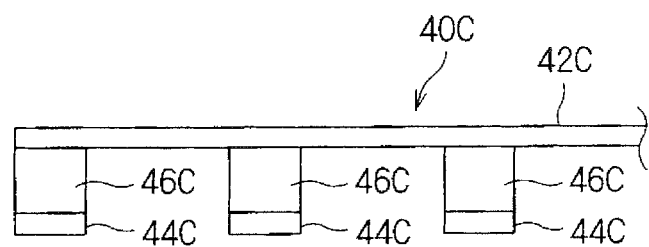
FIG. 8 is a side view showing a mounting member related to a second modified example.

Furthermore, in the same manner as in the second modified example shown in FIG. 8, in a mounting member 40C corresponding to the mounting member 40, an inner circumferential-side engaging portion 42C may be formed to be a continuous long shape, and connectors 46C and outer circumferential-side engaging portions 44C may be intermittently formed along the longitudinal direction of the inner circumferential-side engaging portion 42C, that is, may be partially formed with a distance therebetween. Additionally, horizontal cross-sectional shapes themselves of the connectors 46C and the outer circumferential-side engaging portion 44C may be in the same shape as the connector 46 and the outer circumferential-side engaging portion 44.

According to the second modified example, the material that forms the mounting member 40C can be reduced.

Furthermore, it is acceptable if only the outer circumferential-side engaging portion is intermittently formed along the longitudinal direction. Additionally, the outer circumferential-side engaging portion may be formed in a continuous long shape, and the inner circumferential-side engaging portion may be intermittently formed along the longitudinal direction of the outer circumferential-side engaging portion. Furthermore, the connector may be formed in a continuous long shape, and both of the inner and outer circumferential-side engaging portions may be intermittently formed along the longitudinal direction of the connector. That is, if at least one of the inner and outer circumferential-side engaging portions is intermittently formed along the longitudinal direction of the mounting member, the material can be reduced, and the passage maintaining member can be mounted.

In this case, for the passage maintaining member, a member may be used that is constituted in the same manner as the passage maintaining members 30 and 30B. Of course, the locations in which the openings 32 and 32B of the passage maintaining members 30 and 30B are formed may be intermittently formed according to the locations in which the connectors 46C and the outer circumferential-side engaging portion 44C are formed. That is, at at-least part of the passage maintaining member in the longitudinal direction, an opening may be formed that goes through the inner and outer circumferential sides.

Additionally, each structure explained in the above embodiments and each modified example may be appropriately combined as long as they are not inconsistent with each other.

This invention was explained in detail above, but the above explanation is an example in all aspects, and this invention is not limited to this. Countless modified examples that are not shown are not out of the scope of this invention and are construed to be within the scope of this invention.

The invention claimed is:

1. A corrugated tube with a passage maintaining member, comprising:
    a corrugated tube having annular convex portions and annular concave portions alternately disposed along a longitudinal direction of the corrugated tube and a slit formed along the longitudinal direction of the corrugated tube;
    a die-molded passage maintaining member maintaining a shape at least part of which is curved along the longitudinal direction of the corrugated tube, the passage maintaining member having: (i) an arc-shaped horizontal cross section, and (ii) an opening that passes through inner and outer circumferential sides of the passage maintaining member and extends along at least part of the longitudinal direction of the corrugated tube, the passage maintaining member being arranged along an outer circumference of the corrugated tube in a state in which the opening is arranged at an outer circumferential side of the slit; and
    a mounting member having: (i) an inner circumferential-side engaging portion that is configured to engage an inner circumferential-side portion of the slit of the corrugated tube, (ii) an outer circumferential-side engaging portion that is configured to engage an outer circumferential-side portion of the opening of the passage maintaining member, and (iii) a connector that connects the inner and outer circumferential-side engaging portions.

2. The corrugated tube with a passage maintaining member as set forth in claim 1, wherein the mounting member is deformable according to the shape of the passage maintaining member in the longitudinal direction of the corrugated tube.

3. A wire harness comprising:
    the corrugated tube with a passage maintaining member as set forth in claim 2; and
    a wire harness main body portion that is provided with at least one wire and is inserted through the corrugated tube that has the passage maintaining member.

4. The corrugated tube with a passage maintaining member as set forth in claim 1, wherein a horizontal cross-sectional shape of the mounting member is constant along a longitudinal direction of the mounting member.

5. A wire harness comprising:
    the corrugated tube with a passage maintaining member as set forth in claim 4; and
    a wire harness main body portion that is provided with at least one wire and is inserted through the corrugated tube that has the passage maintaining member.

6. The corrugated tube with a passage maintaining member as set forth in claim 1, wherein at least one of the inner and outer circumferential-side engaging portions is intermittently formed along a longitudinal direction of the mounting member.

7. A wire harness comprising:
    the corrugated tube with a passage maintaining member as set forth in claim 6; and
    a wire harness main body portion that is provided with at least one wire and is inserted through the corrugated tube that has the passage maintaining member.

8. The corrugated tube with a passage maintaining member as set forth in claim 1, wherein the passage maintaining member is divided into two divided parts at the opening.

9. A wire harness comprising:
    the corrugated tube with a passage maintaining member as set forth in claim 8; and
    a wire harness main body portion that is provided with at least one wire and is inserted through the corrugated tube that has the passage maintaining member.

10. The corrugated tube with a passage maintaining member as set forth in claim 1, wherein the opening in the passage maintaining member does not extend along an entire length of the passage maintaining member so that both side portions of the passage maintaining member remain in a connected state.

11. A wire harness comprising:
the corrugated tube with a passage maintaining member as set forth in claim 10; and
a wire harness main body portion that is provided with at least one wire and is inserted through the corrugated tube that has the passage maintaining member.

12. A wire harness comprising:
the corrugated tube with a passage maintaining member as set forth in claim 1; and
a wire harness main body portion that is provided with at least one wire and is inserted through the corrugated tube that has the passage maintaining member.

13. A corrugated tube with a passage maintaining member, comprising:
a corrugated tube including:
annular convex portions and annular concave portions alternately disposed along a longitudinal direction of the corrugated tube, and
a slit formed along the longitudinal direction of the corrugated tube;
a rigid passage maintaining member at least part of which is curved along the longitudinal direction of the corrugated tube, the passage maintaining member having
an arc-shaped horizontal cross section, and
an opening that passes through inner and outer circumferential sides of the passage maintaining member and that extends along at least part of the longitudinal direction of the corrugated tube, the passage maintaining member being arranged along an outer circumference of the corrugated tube in a position in which the opening is arranged at an outer circumferential side of the slit; and
a mounting member having
(i) an inner circumferential-side engaging portion that engages an inner circumferential-side portion of the slit of the corrugated tube,
(ii) an outer circumferential-side engaging portion that engages an outer circumferential-side portion of the opening of the passage maintaining member,
(iii) a connector that inter-connects the inner and outer circumferential-side engaging portions, and
(iv) a U-shaped groove configured to receive: (i) side peripheral portions of the slit of the corrugated tube, and (ii) side peripheral portions of the opening of the passage maintaining member.

14. The corrugated tube with a passage maintaining member as set forth in claim 13, wherein the mounting member is deformable according to the shape of the passage maintaining member in the longitudinal direction of the corrugated tube.

15. The corrugated tube with a passage maintaining member as set forth in claim 13, wherein a horizontal cross-sectional shape of the mounting member is constant along a longitudinal direction of the mounting member.

16. The corrugated tube with a passage maintaining member as set forth in claim 13, wherein at least one of the inner and outer circumferential-side engaging portions is intermittently formed along the longitudinal direction of the mounting member.

17. The corrugated tube with a passage maintaining member as set forth in claim 13, wherein the passage maintaining member is divided into two divided parts at the opening.

18. The corrugated tube with a passage maintaining member as set forth in claim 13, wherein the opening in the passage maintaining member does not extend along an entire length of the passage maintaining member so that both side portions of the passage maintaining member remain in a connected state.

19. A wire harness comprising:
the corrugated tube with a passage maintaining member as set forth in claim 13; and
a wire harness main body portion that is provided with at least one wire and is inserted through the corrugated tube that has the passage maintaining member.

* * * * *